(12) United States Patent
Asundi et al.

(10) Patent No.: US 8,194,124 B2
(45) Date of Patent: Jun. 5, 2012

(54) IN-LINE DIGITAL HOLOGRAPHIC MICROSCOPE AND A METHOD OF IN-LINE DIGITAL HOLOGRAPHIC MICROSCOPY

(75) Inventors: Anand Krishna Asundi, Nanyang View (SG); Vijay Raj Singh, Singapore (SG)

(73) Assignee: Nanyang Technological University, Singapore (SG)

( * ) Notice: Subject to any disclaimer, the term of this patent is extended or adjusted under 35 U.S.C. 154(b) by 1274 days.

(21) Appl. No.: 11/907,072

(22) Filed: Oct. 9, 2007

(65) Prior Publication Data

US 2009/0091811 A1    Apr. 9, 2009

(51) Int. Cl.
*H04N 7/18* (2006.01)
*G03H 1/16* (2006.01)

(52) U.S. Cl. ............................. 348/79; 359/29

(58) Field of Classification Search .............. 348/79–80; 359/9, 29, 32–35; 356/457
See application file for complete search history.

(56) References Cited

U.S. PATENT DOCUMENTS

| | | | | |
|---|---|---|---|---|
| 3,838,903 A * | 10/1974 | Leith et al. | | 359/12 |
| 4,955,974 A * | 9/1990 | Rhodes et al. | | 378/36 |
| 5,214,581 A * | 5/1993 | Rhodes et al. | | 378/7 |
| 6,262,818 B1 * | 7/2001 | Cuche et al. | | 359/9 |
| 6,411,406 B1 * | 6/2002 | Kreuzer | | 359/10 |
| 6,943,924 B2 * | 9/2005 | Marquet et al. | | 359/9 |
| 7,486,406 B2 * | 2/2009 | Kim | | 356/497 |
| 7,812,959 B1 * | 10/2010 | Kim | | 356/458 |
| 7,880,891 B1 * | 2/2011 | Kim | | 356/457 |
| 2008/0137933 A1 * | 6/2008 | Kim | | 382/131 |

OTHER PUBLICATIONS

Jorge Garcia-Sucerquia, Wenbo Xu, Stephan K. Jericho, Peter Klages, Manfred H. Jericho, and H. Jürgen Kreuzer, "Digital in-line holographic microscopy," Applied Optics vol. 45, No. 5, pp. 836-850 (Feb. 10, 2006).*

Tong Zhang and Ichirou Yamaguchi, "Three-dimensional microscopy with phase-shifting digital holography," Optics Letters, vol. 23, No. 15, pp. 1221-1223 (Aug. 1, 1998).*

* cited by examiner

*Primary Examiner* — George C Neurauter
(74) *Attorney, Agent, or Firm* — Dickstein Shapiro LLP (57) ABSTRACT

A holographic microscope comprising a source configured to provide a diverging beam of radiation, a beam splitter configured to direct a first portion of the diverging beam towards an object and a second portion of the diverging beam towards a reflector, the beam splitter being further configured to direct an object beam from the object and a reference beam from the reflector towards a transducer, and the transducer being configured to provide a signal indicative of the interference pattern of the object beam and the reference beam incident on the transducer. A method of digital holography is also disclosed.

14 Claims, 6 Drawing Sheets

67.1 KHz   67.0 KHz   66.9 KHz   65.9 KHz

Fig. 12 (a)

415.5 KHz   415.0 KHz   415.3 KHz

IN-LINE DIGITAL HOLOGRAPHIC MICROSCOPE AND A METHOD OF IN-LINE DIGITAL HOLOGRAPHIC MICROSCOPY

TECHNICAL FIELD

The invention relates to a holographic microscope and a method of holographic microscopy and relates more particularly, but not exclusively, to an in-line lensless digital holographic microscope and a method of in-line lensless digital holographic microscopy.

BACKGROUND

Microelectromechanical systems (MEMS) may include forming mechanical elements, electronics, sensors and actuators on a common silicon substrate using micromachining technology. MEMS are becoming increasingly important in scientific and engineering fields. It is desirable for both development and testing that the mechanical properties of MEMS structures can be accurately observed. This may require static and/or dynamic observation.

Various methods exist for optical metrology. For example U.S. Pat. No. 6,262,818 discloses an off-axis digital holographic microscope. The illumination source is expanded into a collimated beam, with magnification provided by optical lenses.

SUMMARY

In general terms in a first aspect the invention proposes a holographic microscope with a diverging beam illumination source. This may have the advantage that the hardware configuration is simplified and/or reduced in size by removing the need for lenses. Because the components are able to be placed closer together, the numerical aperture may be increased which may result in improved lateral resolution, depth resolution, and/or reduced twin image noise in the real image plane.

In a second independent aspect the invention proposes an in-line digital holographic microscope. This may have the advantage that the distance from the object to the transducer can be minimised, allowing wider field of view, higher imaging resolution and/or higher phase sensitivity.

In a third independent aspect the invention proposes a digital holographic microscope with a reflector provided on an external surface of a beam splitter. This may have the advantage of allowing more compact hardware.

In a forth independent aspect the invention proposes a digital holographic microscope with a spatial light modulator provided to modulate a reference beam. This may have the advantage of allowing control of the reference beam.

The four independent aspects may be also combined in one or more combinations.

In a first specific expression of the invention there is provided a holographic microscope comprising:
a source configured to provide a diverging beam of radiation,
a beam splitter configured to direct a first portion of the diverging beam towards an object and a second portion of the diverging beam towards a reflector,
the beam splitter being further configured to direct an object beam from the object and a reference beam from the reflector towards a transducer, and
the transducer being configured to provide a signal indicative of the interference pattern of the object beam and the reference beam incident on the transducer.

The signal may be a digital signal. The microscope may further comprise a processor configured to receive the signal and to determine desired characteristics of the object based on at least the signal. The microscope may be lensless and/or the diverging beam may be unfocussed. The transducer may be a Charge Coupled Device (CCD) digital image sensor. The reflector may have a reflecting surface configured to be transverse to the diverging radiation beam to reflect the second portion as the reference beam. The microscope may be an in-line digital holographic microscope. The reflector may be a reflective coating on a surface of the beam splitter distant to the source. The reflector may be a spatial light modulator.

In a second specific expression of the invention there is provided a method of digital holography comprising:
providing a diverging beam of radiation,
splitting the diverging beam towards an object and a reflector,
directing an object beam from the object and a reference beam from the reflector towards a transducer, and
providing a signal indicative of the interference pattern of the object beam and the reference beam incident on the transducer.

The method may further comprise processing the signal to determine desired characteristics of the object. The processing the signal may comprise:
storing the signal in the form of a digital hologram,
zero padding the digital hologram,
determining a reconstruction wave,
determining an impulse response function, and
determining a reconstructed wavefront based on the zero padded hologram, the reconstruction wave and the impulse response function.

The digital hologram may be in the form:

$$H(m,n) = \left[ H(\xi,\eta) \otimes rect\left(\frac{\xi}{\alpha\Delta\xi}, \frac{\eta}{\beta\Delta\eta}\right) \right] \times rect\left(\frac{\xi}{M\Delta\xi}, \frac{\eta}{N\Delta\eta}\right) comb\left(\frac{\xi}{\Delta\xi}, \frac{\eta}{\Delta\eta}\right)$$

The zero padding may be in the form:

$$M'_x = \frac{(D-d_1)}{(D-d_2)} \frac{d_2}{d_1} M$$

The reconstruction wave is a converging spherical wave which may be determined according to the optical system geometry, for example the complex conjugate of the diverging spherical reference wave.

The impulse response function may be determined according to:

$$g(\xi,\eta) = \frac{e^{ikd'}}{i\lambda d'} \exp\left\{\frac{i\pi}{\lambda d'}(\xi^2+\eta^2)\right\}$$

The reconstructed wavefront may be determined according to:

$$U(x',y') = \Im\{H(\xi,\eta)R^*(\xi,\eta)g(\xi,\eta)\}$$

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings, in which:

FIGS. 8(a) and (b) are images of reconstructions at different depths with partial zero padding;

FIGS. 8(c) to (d) are images of reconstructions at different depths with further zero padding;

DETAILED DESCRIPTION OF EXEMPLARY EMBODIMENTS

Figure 1:
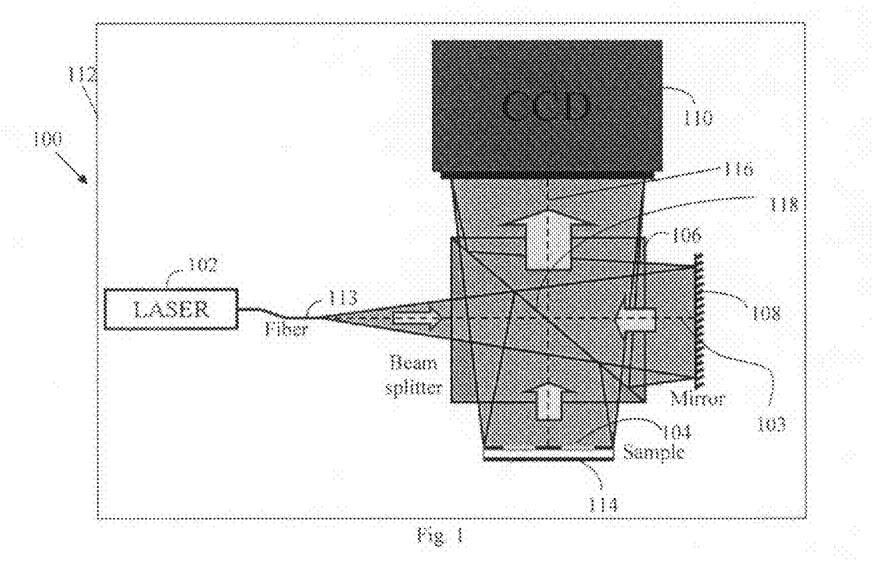
FIG. 1 is a holographic microscope according to an exemplary embodiment.

A holographic microscope 100 is shown in FIG. 1 according to an exemplary embodiment. A source 102 provides a diverging beam of radiation which is centred about a lateral axis 103. A beam splitter 106 separates the diverging beam; reflecting a portion towards an object 104 and transmitting a portion to a reflector 108 located behind the beam splitter 106. The scatter from the object 104 is called an object beam O and the reflection from the reflector 108 is called the reference beam R. The beam splitter 106 transmits the object beam O towards, and reflects the reference beam R at, a transducer 110. The interference pattern between the object beam O and the reference beam R is converted to a digital signal by the transducer 110 which is then processed to determine the desired characteristics of the object 104.

Figure 2:
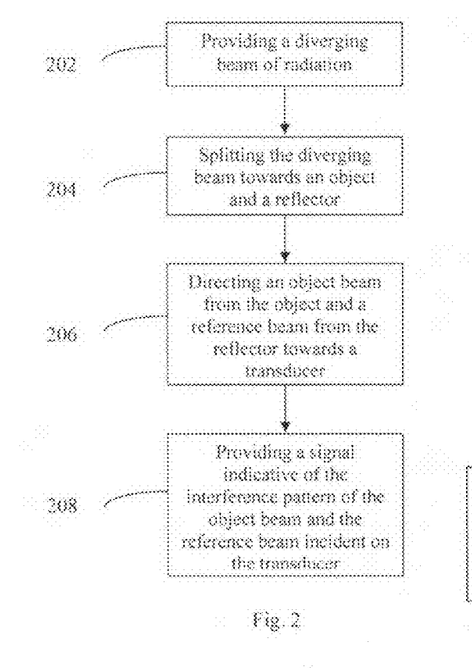
FIG. 2 is a flow diagram of a method of holographic microscopy according to the exemplary embodiment.

FIG. 2 shows a method of holographic microscopy according to the exemplary embodiment. At 202 a diverging beam of radiation is provided. At 204 the diverging beam is split towards an object and a reflector. At 206 an object beam from the object and a reference beam from the reflector are directed towards a transducer. At 208 a signal indicative of the interference pattern of the object beam and the reference beam incident on the transducer is provided for processing. At 210 the signal is processed to determine the desired characteristics of the object.

The microscope 100 is housed in a casing 112. The illumination source 102 may for example be a diverging laser attached within the casing 112. The diverging beam of radiation may be, for example, visible light, visible laser light, UV light, X-rays, or visible blue light. The wavelength of the light may for example be chosen according to the application and/or the required lateral resolution. The diverging beam may be delivered from the end 113 of an optical fibre, where the smaller the diameter of the fibre (for example in the order of a single wavelength) the greater the cone of the emitted light coming through it. Therefore a smaller diameter fibre may increase the Numerical Aperture ("NA") of the system and thus the system resolution. Preferably, there is no lens at the end 113 of the fibre.

The object 104, for example a MEMS device, may be inserted into a cartridge 114, which is then locked into place in the casing 112 for observation. The cartridge 114 may include apertures for electrical connections to the object 104. By controlled energisation of the object 104, dynamic observation is possible. The cartridge 114 may be moveable to adjust the magnification. The object is centred about a longitudinal axis 116.

The beam splitter 106 for example may be a cube beam splitter with an internal partially reflective surface 118 oriented at 45° to the lateral axis 103. The beam splitter 106 is centred about the intersection of the lateral axis 103 and the longitudinal axis 116 and attached within the casing 112. For example the partially reflective surface may be non-polarising and have a transmittance and reflectance of between 40-50% respectively.

The reflector 108 may for example be a mirror centred on and oriented transverse to, the lateral axis 103, and therefore "in-line" with, or parallel to the longitudinal axis 116. The mirror may be attached within the casing 112.

The transducer 110 may for example be a digital image sensor such as a Charged Coupled Device (CCD) or Complementary Metal Oxide Semiconductor (CMOS) sensor centred on the longitudinal axis 116 and attached with the casing 112.

The signal from the transducer may be processed by a processor such as a Digital Signal Processor (DSP) according to a programmed algorithm. The processor may also control the object for dynamic observation.

Figure 3:
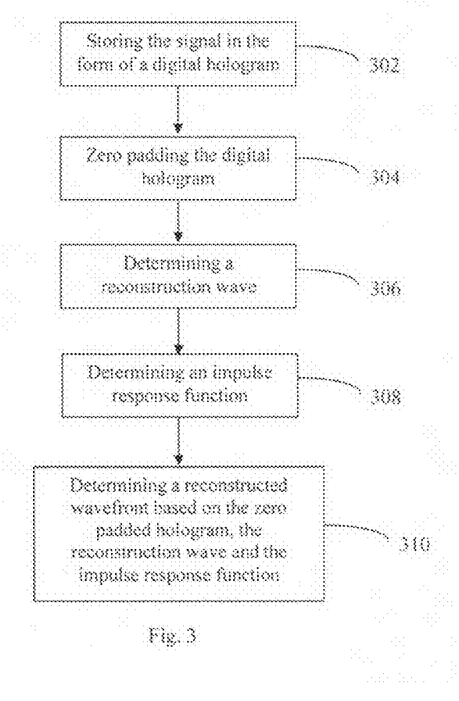
FIG. 3 is a flow diagram of an algorithm according to the exemplary embodiment.
Figure 4:
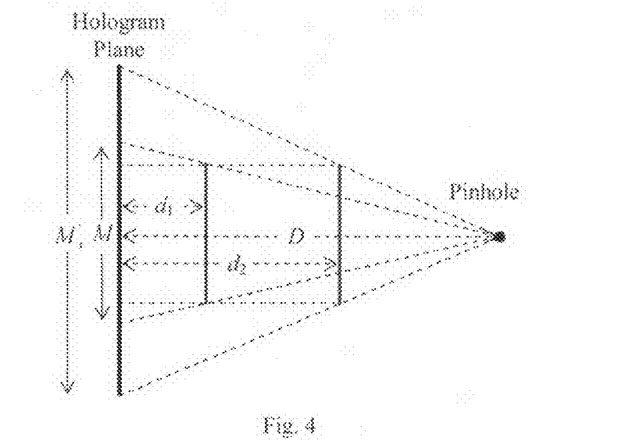
FIG. 4 is a diagram of a diverging-wave digital holography geometry.

For example FIG. 3 shows an algorithm 300 for processing the signal according to an exemplary embodiment. At 302 the digital hologram is stored digitally. At 304 the digital hologram is zero padded. At 306 a reconstruction wave is determined. At 308 an impulse response function is determined. At 310 a reconstructed wavefront is determined based on the zero padded hologram, the reconstruction wave and the impulse response function. The intensity and/or the phase of the reconstructed wavefront can be used to determine desired characteristics of the object 104.

Let (x, y) be the object plane and $(\xi, \eta)$ be the hologram plane. The diverging beam from the fibre is divided into two parts called object $O(\xi, \eta)$ and reference $R(\xi, \eta)$ waves. The hologram $H(\xi, \eta)$, which is the interference of the object wave $O(\xi, \eta)$ and reference wave $R(\xi, \eta)$, may be represented as shown in Equation (1):

$$H(\xi,\eta)=|O(\xi,\eta)|^2+|R(\xi,\eta)|^2+O^*(\xi,\eta)R(\xi,\eta)+O(\xi,\eta)R^*(\xi,\eta) \quad (1)$$

where O* and R* are the complex conjugate of the O and R respectively.

The transducer, at the hologram plane, records this interference pattern. The recorded pattern may be represented as a two-dimensional array of discrete signals using the sampling theorem. Let M×N be the total number of pixels of the CCD with corresponding size $\Delta\xi$ and $\Delta\eta$, then the digital hologram H(m,n) stored at 302, can be shown as in Equation (2):

$$H(m, n) = \left[H(\xi, \eta) \otimes rect\left(\frac{\xi}{\alpha\Delta\xi}, \frac{\eta}{\beta\Delta\eta}\right)\right] \times \quad (2)$$

-continued $$rect\left(\frac{\xi}{M\Delta\xi}, \frac{\eta}{N\Delta\eta}\right) comb\left(\frac{\xi}{\Delta\xi}, \frac{\eta}{\Delta\eta}\right)$$

where ⊗ represents the two-dimensional convolution and (α, β)∈[0,1] are the fill factors of the CCD pixels.

As the recording distance increases, the magnification increases, but a corresponding decrease in the reconstructed image size may counteract an increased magnification. The process at 304 may be implemented by fictitiously increasing the hologram size by zero-padding, to mitigate the loss in image size.

In the exemplary embodiment, reconstruction pixel size along the x, and y dimensions change depending on the distance from the object to transducer. To keep the analysis concise we present equations only for the x dimension, but the same equations hold for the y dimension too. The pixel size change in the x dimension is shown in Equation (3):

$$\Delta x' = \frac{\lambda d}{M \times \Delta \xi} \tag{3}$$

where $\Delta\xi$ and $\Delta x'$ are the x dimension pixel size at the recording and at the reconstruction planes respectively, $\lambda$ is the wavelength of the laser, M is the total number of pixels along x direction and d is the distance from the object to the transducer.

In order to have equal pixel size at reconstruction distances $d_1$ and $d_2$ ($d_1$ and $d_2$ are shown from the transducer to the reconstructed image plane) the hologram size may be increased from $M_x$ to $M_x'$ by zero padding as shown in Equation (4):

$$M_x' = \frac{d_2}{d_1} M \tag{4}$$

Following reconstruction the central M×N portion of the propagated wavefront is retained. Zero padding fictitiously increases the hologram size which may compensate for the pixel resizing effect of reconstruction.

The reconstructing wave may also decrease the pixel size of the reconstruction wavefront. An additional zero padding of the hologram by a factor of $(D-d_1)/(D-d_2)$ may be used to compensate for this, so that overall pixel number of the hologram is shown in Equation (5):

$$M_x' = \frac{(D-d_1)}{(D-d_2)} \frac{d_2}{d_1} M \tag{5}$$

where D is the distance between the fibre and the transducer (via the mirror).

The additional zero padding further compensates so that the pixel size remains constant for different levels of magnification.

Figure 5:
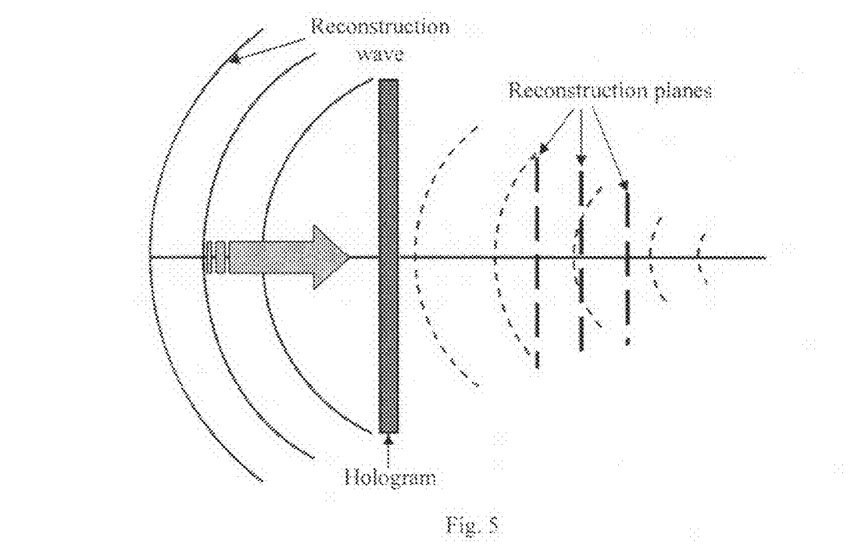
FIG. 5 is a schematic of the reconstruction wave.

Determining the reconstruction wave $R^*(\xi,\eta)$ at 306 may be implemented by calculating the complex conjugate of the diverging reference wave. The reconstruction geometry is shown in FIG. 5. The reconstruction wave is determined by calculating the reference wave from optical geometry and then calculating the complex conjugate or inverse of the reference wave.

Let U(x', y') be the reconstructed wavefront behind the hologram. If the reconstruction wave is the complex conjugate of the reference wave, and the hologram $H(\xi,\eta)$ is illuminated by the reconstruction wave $R^*(\xi,\eta)$, then a real image of the object is formed at an image plane (x', y') at a distance d' from the hologram plane where d' is same as the distance d from the object 104 to the transducer 110. U(x', y') may be defined as shown in Equation (6):

$$U(x', y') = \frac{d'}{i\lambda} \int_{-\infty}^{\infty}\int_{-\infty}^{\infty} H(\xi, \eta) R^*(\xi, \eta) \frac{\exp(ikr)}{r^2} d\xi d\eta \tag{6}$$

where $k = \frac{2\pi}{\lambda}$, is the wave number and r is defined by the Fresnel's approximation as shown in Equation (7):

$$r \approx d'\left[1 + \frac{1}{2}\left(\frac{x'-\xi}{d'}\right)^2 + \frac{1}{2}\left(\frac{y'-\eta}{d'}\right)^2\right] \tag{7}$$

Equation (6) can be rewritten using Equation (7), in the form of a Fresnel approximation or Fresnel transform as shown in Equation (8):

$$U(x', y') = \tag{8}$$
$$\frac{e^{ikd'}}{i\lambda d'} \int_{-\infty}^{\infty}\int_{-\infty}^{\infty} H(\xi, \eta) R^*(\xi, \eta) \exp\left[\frac{i\pi}{\lambda d'}\{(x'-\xi)^2 + (y'-\eta)^2\}\right] d\xi d\eta$$

Determining the impulse response $g(\xi,\eta)$ at 308 may be implemented as shown in Equation (9):

$$g(\xi, \eta) = \frac{e^{ikd'}}{i\lambda d'} \exp\left\{\frac{i\pi}{\lambda d'}(\xi^2 + \eta^2)\right\} \tag{9}$$

The impulse response is calculated according to the optical system geometry.

Equation (8) can be rewritten using Equation (9), as shown in Equation (10):

$$U(x', y') = e^{i\pi d'(v^2+\mu^2)} \tag{10}$$
$$\int_{-\infty}^{\infty}\int_{-\infty}^{\infty} H(\xi, \eta) R^*(\xi, \eta) g(\xi, \eta) \exp[-2\pi i\{\xi v + \eta \mu\}] d\xi d\eta$$

where $v = \frac{x'}{\lambda d'}$ and $\mu = \frac{y'}{\lambda d'}$ are the spatial frequencies present in the hologram.

Determining the reconstructed wavefront at 310 may be implemented by calculating the Fourier transform of the product of the hologram, the reconstruction wave and the impulse response function, as shown in Equation (11):

$$U(x',y') = \Im\{H(\xi,\eta)R^*(\xi,\eta)g(\xi,\eta)\} \tag{11}$$

The image intensity can be calculated as shown in Equation (12):

$$I(x',y') = |U(x',y')|^2 \tag{12}$$

The phase can be calculated as shown in Equation (13):

$$\varphi(x', y') = \arctan\frac{\operatorname{Im}(U(x', y'))}{\operatorname{Re}(U(x', y'))} \quad (13)$$

The numerical reconstruction of digital holograms can provide the 3-D reconstruction of the image from the two dimensional hologram. Another advantage may be that the twin image is less problematic in the reconstructed real image. This is because the twin image forms on the opposite side of the real image and appears as a defocused image at the real image plane. In case of smaller size objects, the amplitude of the twin image may be significantly smaller at the real image plane. Also, because of the divergence of the out-of-focus twin image at the real image plane, the amplitude may become negligible compared with the real image wave. Increasing the lateral size of the hologram using zero padding may further decrease the background noise created by the twin image. The effect zero-order term during reconstruction of the in-line hologram can be removed by pre-processing of hologram using high-pass filter.

The lateral resolution of system may depend on the numerical aperture (NA) and wavelength, similar to a conventional microscope. According to the Rayleigh criteria of resolution, the minimum distance requirement $\Delta x$ between of two points to be resolved, may be approximated by Equation (14):

$$\Delta x \geq \frac{\lambda}{2 \cdot (NA)} \quad (14)$$

The depth of focus $\Delta z$, or depth resolution, may be approximated by Equation (15):

$$\Delta z \geq \frac{\lambda}{2 \cdot (NA)^2} \quad (15)$$

Therefore 3-D resolution may be increase with a larger NA. A larger CCD sensing area increases the NA of the system because of larger light collection capability and will also increase the 3-D resolution.

Magnification of the system may be approximated by Equation (16)

$$D/(D-d) \quad (16)$$

where D is the fibre 102 to transducer 110 distance (measured via the mirror) and d is the object 104 to the transducer 110 distance. The positioning of the object plane may be used to change the magnification of the system.

Figure 6:
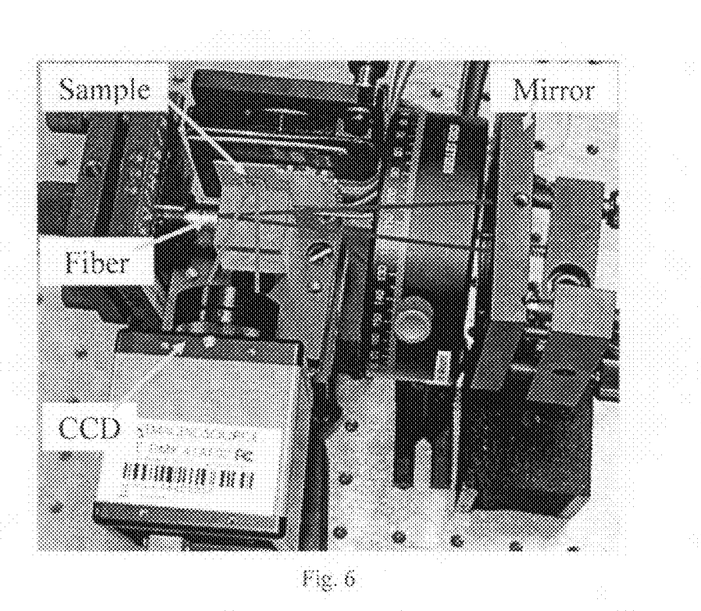
FIG. 6 is a photograph of the experimental configuration.

An experimental configuration shown in FIG. 6, similar to the exemplary embodiment described above, was used to record a hologram of a USAF target. A blue diode laser ($\lambda$=0.405 µm) was used for the recording and the fibre to CCD distance D is 38 mm. The CCD has 1280×960 pixels, each 4.65 µm×4.65 µm in size. To achieve different magnifications, three holograms were recorded corresponding to the distances d 20.33 mm, 21.33 mm, and 27.07 mm from the fibre to the object.

Figure 7:
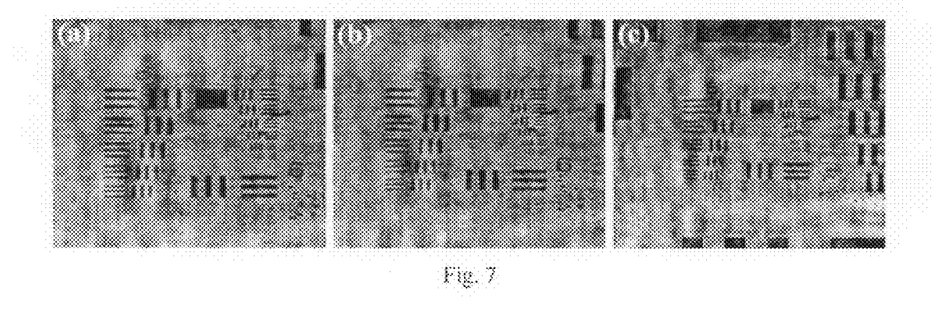
FIGS. 7(a) to (c) are images of reconstructions at different depths without zero padding.

FIGS. 7(*a*), (*b*) and (*c*) show the results from the experimental configuration without step 304. Here the central part (contains 200×200 pixels) of the reconstructed images shows the central region (group 7) of the USAF target. It can be seen that the image has shifted towards the centre in the reconstructed images as the distance d increases. The magnification should be highest in FIG. 7(*c*), but because of the reduction of the pixel size it is actually lower.

Figure 8:
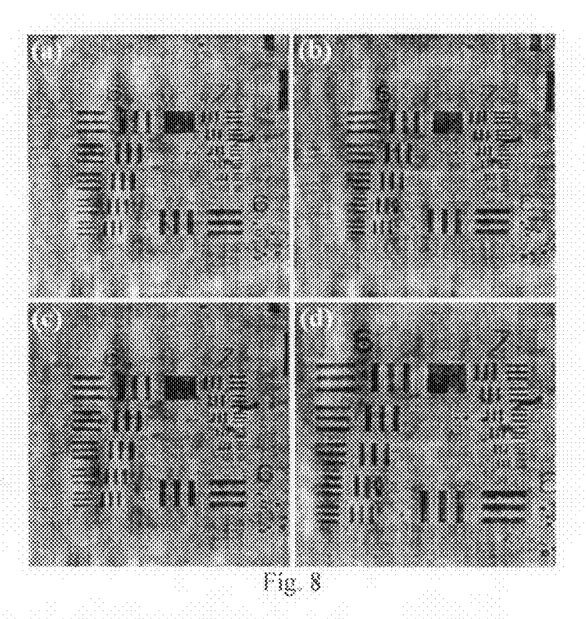

FIGS. 8(*a*) & (*b*) show the reconstruction after zero padding according to Equation (4) at distances 21.33 mm & 27.07 mm respectively, here considering 20.33 mm as the reference distance ($d_1$). It can be seen that the image sizes corresponding to all the three distances (FIGS. 7(*a*), 8(*a*) and 8(*b*)) are same (rather than smaller), but still not magnified. With zero-padding according to Equation (5), as is shown in FIGS. 8(*c*) & 8(*d*) for the distance 21.33 mm & 27.07 mm respectively, (again $d_1$=20.33 mm), magnification is clearly higher corresponding to the larger distance.

Figure 9:
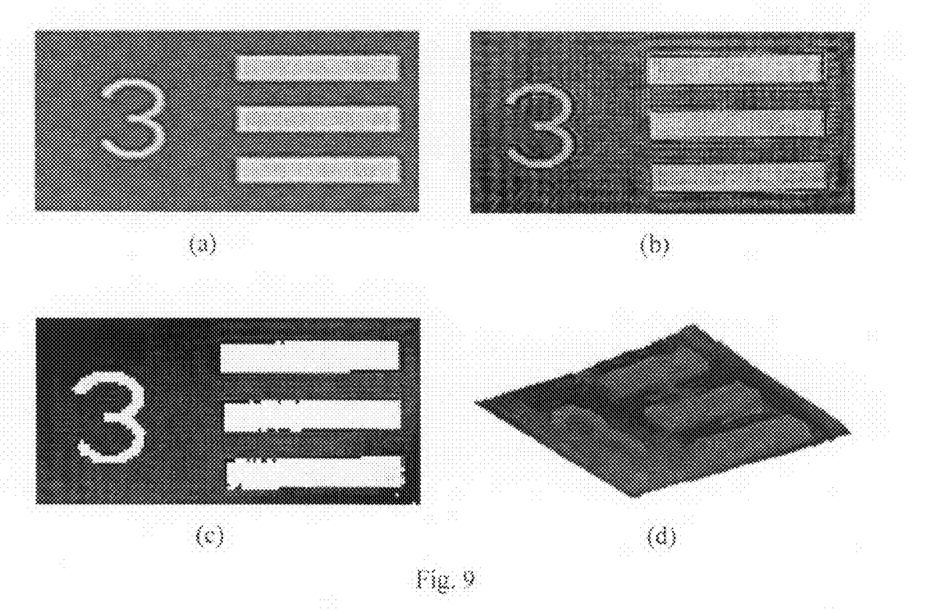
FIG. 9(a) is an optical microscopic image.
FIGS. 9(b) to (d) are reconstructed images.

FIG. 9(*a*) shows an image form an optical microscope with 5× magnification. FIG. 9(*b*) is the reconstructed amplitude image using the experimental configuration, and FIG. 9(*c*) is the phase image using the experimental configuration. The 3-D profile of the object can be reconstructed using the phase image shown in FIG. 9(*d*).

Figure 10:
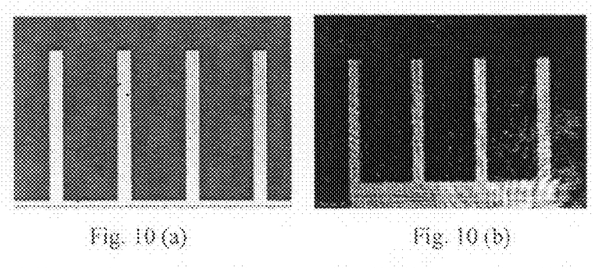
FIG. 10(a) is an optical microscopic image.
FIG. 10(b) is a reconstructed image.
Figure 11:
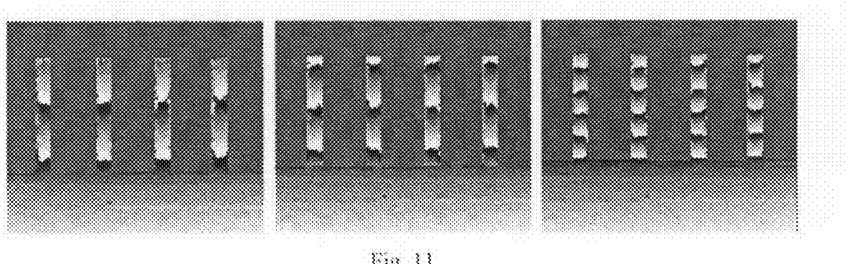
FIG. 11 are reconstructed images of cantilevers with increasing amount of deformation.
Figure 12:
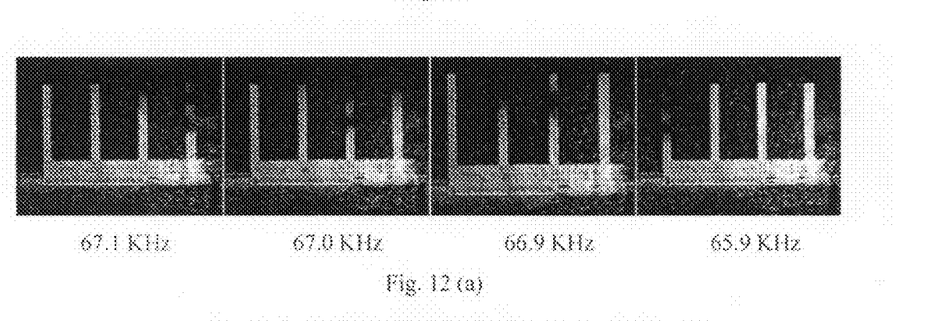
FIG. 12(a) is reconstructed images of cantilevers at first resonant frequency.
FIG. 12(b) is reconstructed images of cantilevers at second resonant frequency.

Static and dynamic observation of MEMS cantilevers (50 µm×200 µm) are shown is FIGS. 10, 11 & 12. FIG. 10(*a*) shows the imaging of cantilevers with normal optical microscope and FIG. 10(*b*) using the experimental configuration. FIG. 11 shows the static deformations in the cantilevers with increasing amount of deformation quantity using the experimental configuration. The direct phase subtraction gives the modulo 2π interference fringes without any phase shifting techniques. FIGS. 12(*a*) & 12(*b*) show the first and second vibration frequencies characterisation of the cantilevers using the experimental configuration. The time averaged vibration fringes are modulated by the zero order Bessel. The shift in the vibration resonant frequencies (both first and second resonant frequencies) for different cantilevers can be clearly seen.

Figure 13:
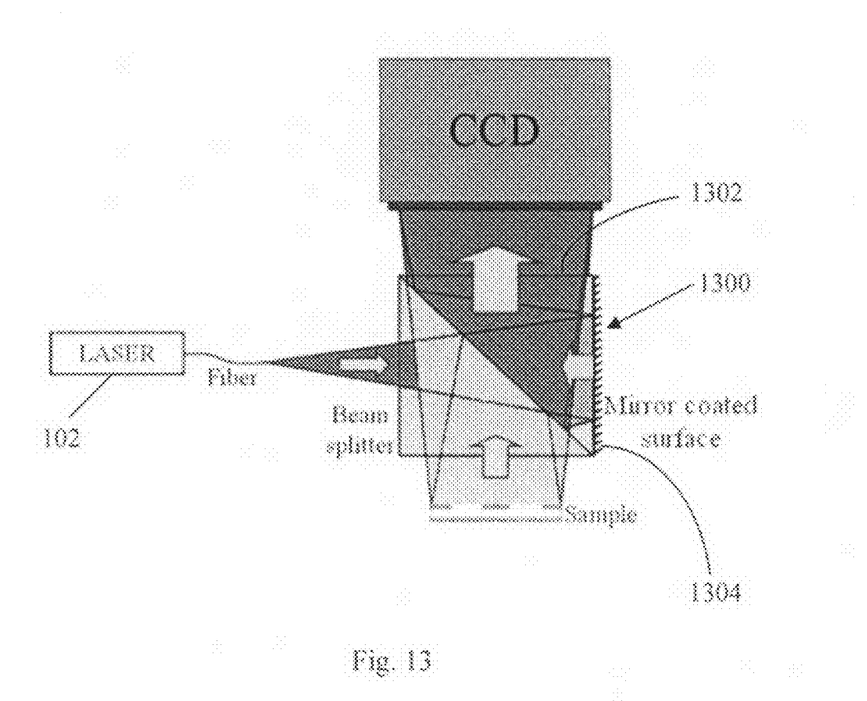
FIG. 13 is a holographic microscope according to a further exemplary embodiment.

In a further exemplary embodiment shown in FIG. 13 the reflector may be a mirrored surface 1300 on a beam splitter 1302. The mirrored surface such as aluminium gold or silver may be deposited on a face 1304 of the beam splitter opposite to the source 102. In all other aspects this embodiment is smaller to that described above.

Figure 14:
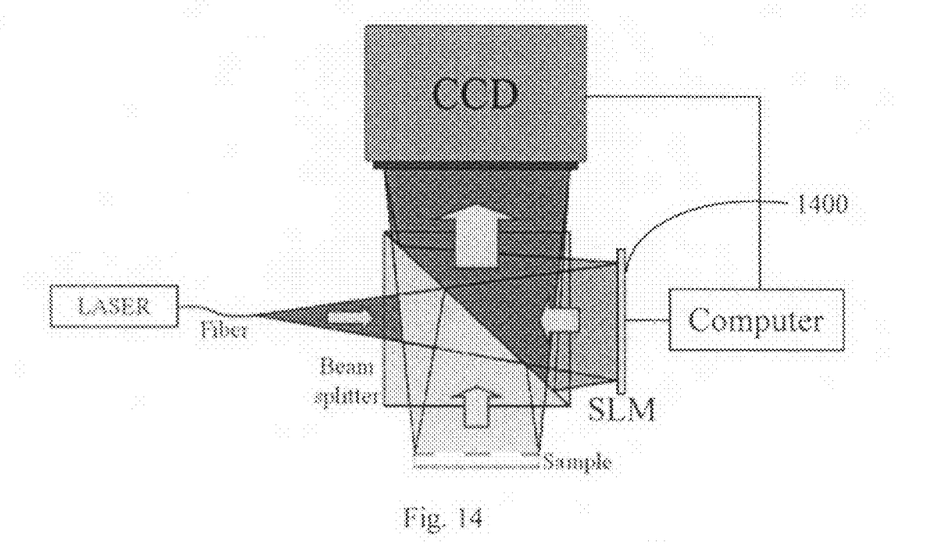
FIG. 14 is a holographic microscope according to another exemplary embodiment.

In a still further exemplary embodiment shown in FIG. 14 the reflector may be a spatial light modulator (SLM) 1400. The SLM 1400 may allow the reference wave to be modulated for more flexibility in the reference wave.

The terms lensless and unfocused may in the context of at least one embodiment be understood to mean that the microscope does not include a lens between the beam splitter and the object and/or between the beam splitter and the transducer.

Whilst there has been described in the foregoing description exemplary embodiments, it will be understood by those skilled in the technology concerned that many variations in details of design, construction and/or operation may be made without departing from the present invention.

The invention claimed is:

1. A holographic microscope comprising:
   a source configured to provide a diverging beam of radiation,
   a beam splitter configured to direct a first portion of the diverging beam towards an object and a second portion of the diverging beam towards a reflector,
   the beam splitter being further configured to direct an object beam from the object and a reference beam from the reflector towards a transducer, and
   the transducer being configured to provide a signal indicative of the interference pattern of the object beam and the reference beam incident on the transducer, wherein the signal is a digital signal, and further comprising a processor configured to receive the signal and to determine desired characteristics of the object based on at least the signal, the processor configured to process the signal by:

storing the signal in the form of a digital hologram,
zero padding the digital hologram,
determining a reconstruction wave,
determining an impulse response function, and
determining a reconstructed wavefront based on the zero padded hologram, the reconstruction wave and the impulse response.

2. The microscope as claimed in claim 1, wherein the microscope is lensless.

3. The microscope as claimed in claim 1, wherein the diverging beam is unfocussed.

4. The microscope as claimed in claim 1 wherein the transducer is a Charge Coupled Device (CCD) digital image sensor.

5. The microscope as claimed in claim 1, wherein the reflector has a reflecting surface configured to be transverse to the diverging radiation beam to reflect the second portion as the reference beam.

6. The microscope as claimed in claim 1, wherein the microscope is an in-line digital holographic microscope.

7. The microscope as claimed in claim 5, wherein the reflector is a reflective coating on a surface of the beam splitter distant to the source.

8. The microscope as claimed in claim 1, wherein the reflector is a spatial light modulator.

9. A method of digital holography comprising:

providing a diverging beam of radiation,
splitting the diverging beam towards an object and a reflector,
directing an object beam from the object and a reference beam from the reflector towards a transducer,
providing a signal indicative of the interference pattern of the object beam and the reference beam incident on the transducer, and
processing the signal to determine desired characteristics of the object, wherein processing the signal comprises:
storing the signal in the form of a digital hologram,
zero padding the digital hologram,
determining a reconstruction wave,
determining an impulse response function, and
determining a reconstructed wavefront based on the zero padded hologram, the reconstruction wave and the impulse response function.

10. The method as claimed in claim 9, wherein the digital hologram is in the form:

$$H(m, n) = \left[ H(\xi, \eta) \otimes rect\left(\frac{\xi}{\alpha\Delta\xi}, \frac{\eta}{\beta\Delta\eta}\right) \right] \times rect\left(\frac{\xi}{M\Delta\xi}, \frac{\eta}{N\Delta\eta}\right) comb\left(\frac{\xi}{\Delta\xi}, \frac{\eta}{\Delta\eta}\right).$$

11. The method as claimed in claim 10, wherein zero padding is in the form:

$$M'_x = \frac{(D - d_1)}{(D - d_2)} \frac{d_2}{d_1} M.$$

12. The method as claimed in claim 11, wherein the reconstruction wave is determined according to the optical system geometry.

13. The method as claimed in claim 12, wherein the impulse response function is determined according to:

$$g(\xi, \eta) = \frac{e^{ikd'}}{i\lambda d'} \exp\left\{ \frac{i\pi}{\lambda d'}(\xi^2 + \eta^2) \right\}.$$

14. The method as claimed in claim 13, wherein the reconstructed wavefront is determined according to:

$$U(x',y') = \Im\{H(\xi,\eta)R^*(\xi,\eta)g(\xi,\eta)\}.$$

* * * * *